United States Patent [19]

Koyama

[11] Patent Number: 4,664,336

[45] Date of Patent: May 12, 1987

[54] MOTOR CONTROL APPARATUS FOR REEL-TO-REEL TAPE DRIVE SYSTEM

[75] Inventor: Yoshiaki Koyama, Kawasaki, Japan

[73] Assignee: Fujitsu Limited, Kanagawa, Japan

[21] Appl. No.: 738,316

[22] Filed: May 28, 1985

[30] Foreign Application Priority Data

May 31, 1984 [JP] Japan ................... 59-111859

[51] Int. Cl.$^4$ ................ G11B 15/43; G11B 15/44; G11B 15/46
[52] U.S. Cl. .................... 242/186; 360/73; 360/74.2
[58] Field of Search .............. 247/186–190; 226/10, 12, 15, 16–30, 42, 43; 360/50, 71, 74.2, 73; 318/7

[56] References Cited

U.S. PATENT DOCUMENTS

| | | |
|---|---|---|
| 3,725,655 | 4/1973 | Edstrom et al. |
| 3,764,087 | 10/1973 | Paananen et al. ............. 242/186 |
| 3,809,335 | 5/1974 | Mantey ............. 242/186 |
| 3,984,868 | 10/1976 | Ragle et al. ............. 360/73 |
| 4,030,131 | 6/1977 | Beiter et al. ............. 360/71 |
| 4,125,881 | 11/1978 | Eige et al. ............. 360/50 |
| 4,172,231 | 10/1979 | D'Alayer de Costemore d'Arc et al. |

FOREIGN PATENT DOCUMENTS 2208474 1/1973 Fed. Rep. of Germany.

Primary Examiner—John M. Jillions
Attorney, Agent, or Firm—Armstrong, Nikaido, Marmelstein & Kubovcik

[57] ABSTRACT

A motor control apparatus for an unbuffered reel-to-reel drive system including independently operable first and second drive motors including first and second sensors for detecting rotation of reels and a circuit for controlling the drive motors cooperatively to maintain tension applied to a tape. The drive motor control circuit controls the drive motors on the basis of a servo-mechanism control algorithm and a stop-lock control algorithm using control signals having hysteresis curves in response to position deviation and a transport direction of the tape.

16 Claims, 42 Drawing Figures

Fig. 6a SP_A 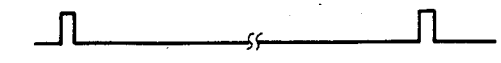
Fig. 6b SP_B-B 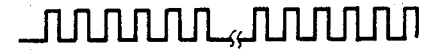

Fig. 7
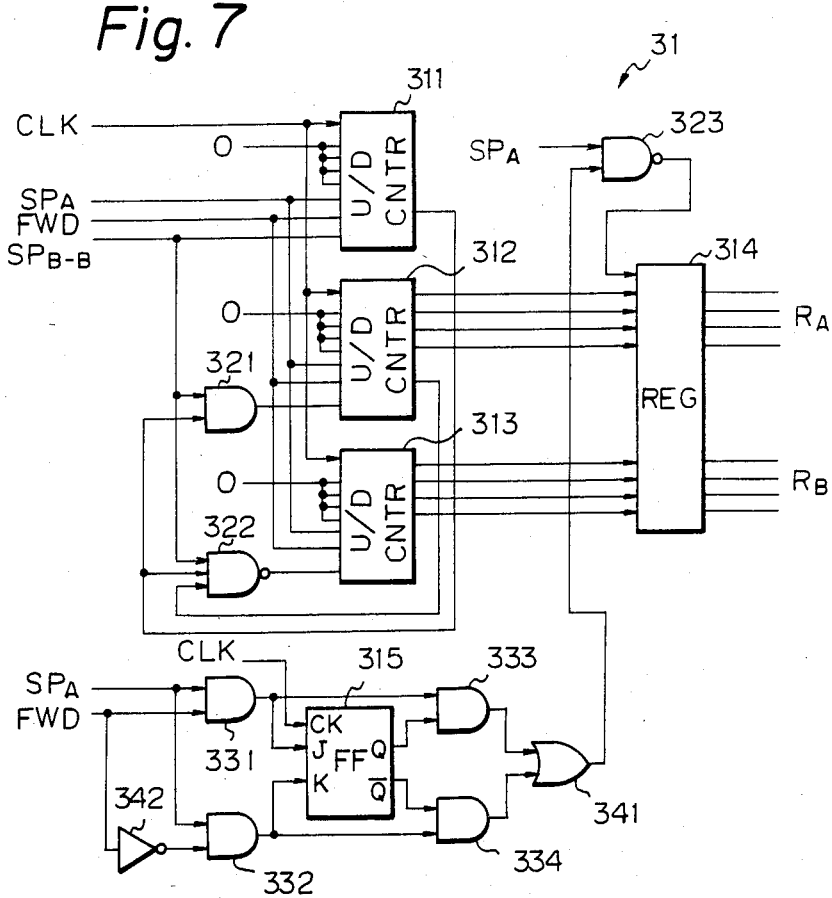

Fig. 9a SP_{B-A} 
Fig. 9b SP_{B-B} 
Fig. 9c S01 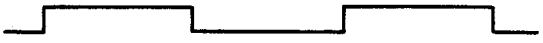
Fig. 9d S02 
Fig. 9e S03 
Fig. 9f S04 
Fig. 9g S05 
Fig. 9h S06 
Fig. 9i S07 
Fig. 9j S08 
Fig. 9k S09 "L" 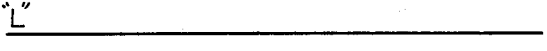
Fig. 9ℓ FWD "H" 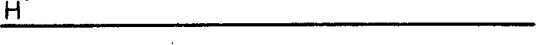
Fig. 9m BWD "L" 

Fig.10a SPB-A
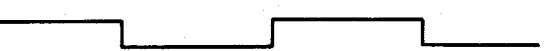
Fig.10b SPB-B
Fig.10c So1
Fig.10d So2
Fig.10e So3
Fig.10f So4
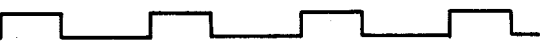
Fig.10g So5
Fig.10h So6
Fig.10i So7
Fig.10j So8 "L"
Fig.10k So9
Fig.10ℓ FWD "L"
Fig.10m BWD "H"

MOTOR CONTROL APPARATUS FOR REEL-TO-REEL TAPE DRIVE SYSTEM

BACKGROUND OF THE INVENTION

1. Field of the Invention

The present invention relates to a motor control apparatus for a reel-to-reel tape drive system, more particularly to a magnetic tape motion control apparatus having a stop-lock means for an unbuffered reel-to-reel magnetic tape drive system which includes separate drive motors for each reel of a reel-to-reel magnetic tape transport apparatus.

2. Description of the Related Art

Recently, a magnetic tape motion control apparatus for a reel-to-reel magnetic tape drive system without a tape buffering mechanism, such as a capstan, has come into use for computer systems.

U.S. Pat. No. 3,764,087 and U.S. Pat. No. 3,984,868 disclose reel-to-reel magnetic tape motion control systems each employing separate drive motors for each reel and requiring no magnetic tape buffering or tachometer in the magnetic tape feed path. In each control system, the reel motors are selectively driven and a tachometer is associated with only the take up reel shaft to provide one pulse per revolution. The pulses are accumulated in a counter as a continuing count indicative of the radius of the magnetic tape wrapped around that reel. However, in these control systems, only one reel is driven at a time, and no means is installed to provide tension control. Accordingly, the above prior arts suffer from slippage of the magnetic tape and lack of precise control of magnetic tape tension and speed.

In order to overcome the above disadvantage, U.S. Pat. No. 4,125,881 discloses an improved magnetic motion control apparatus for a reel-to-reel magnetic tape drive system. The magnetic motion control apparatus is intended to allow high acceleration rates without magnetic tape slippage, maintain magnetic tape tension substantially constant throughout operation, maintain magnetic tape speed substantially constant between periods of acceleration and deceleration, maintain the magnetic tape position when called for, and control the acceleration rate independently of changes in the reel radii.

The above magnetic motion control apparatus includes a magnetic tape driving mechanism, a group of sensors, and a control circuit. The magnetic tape driving mechanism consists of a pair of motors operated jointly by means of a controller, set forth later, a pair of reels driven by the motors, a read/write magnetic head provided between the reels, and a movable rotor provided between the reels and adjacent to the read/write magnetic head. The sensors are a pair of tachometers each directly connected to a respective reel and detecting a rotation of the reel, and a tension sensor detecting a tension applied to the movable rotor. One tachometer outputs a higher rate of rotation pulses than another tachometer to derive radii of the reels. One tachometer also outputs two different phase signals for detecting a rotational direction of the reels. The controller outputs control signals to the pair of motors to achieve the above-mentioned objectives. The controller includes a circuit for providing a single gating pulse each time one of the reels rotates through a relatively large preselected angle, and a circuit for providing a plurality of pulses, one each time the other of the reels rotates through another angle which is substantially smaller than the preselected angle. The controller also includes a counter for counting the number of the plurality of pulses and a circuit operating in response to the single pulse to gate out the count from the counter. The controller further includes a circuit operating in response to each such gated out count to provide currents to each of the motors of a magnitude corresponding to the gated out count according to a predetermined servo algorithm for controlling rotation of the reels, thereby to provide continuing changes in currents as the radii of the reels change.

The prior art disclosed in U.S. Pat. No. 4,125,881 still suffers from inaccuracies in fine position control and fine tension control when the magnetic motion control apparatus is applied to a reel-to-reel magnetic tape drive system in which a high density magnetic tape is used.

Magnetic tape has been highly improved in storage density to, for example, 32,000 bits per inch (BPI) in a longitudinal direction and eighteen tracks, with a resultant shortening of the inter-record gap (IRG). This requires highly precise position control due to the transport direction and unevenness of characteristics of the separate drive motors. The high density magnetic tape enables shortening of the length of the magnetic tape to, for example, 800 feet (243.8 m), with a resultant reduction in the diameter of a reel to, for example, four inches (10.16 cm). This also means a small inertial value of the reel for winding the magnetic tape. The small inertial value means a short delay time in operating the reels, thus facilitating formation of a simplified control system only when the drive system operates in an ideal condition. On the other hand, the drive system having the small inertial value is susceptible to numerous disturbances, such as external noise, unevenness of the characteristics of the drive motors, and fluctuations in tension applied to the magnetic tape and transport speed of the magnetic tape.

Accordingly, in a reel-to-reel magnetic tape drive system in which high density magnetic tape is used, a fine control system is required as a countermeasure for the above disturbances.

SUMMARY OF THE INVENTION

It is an object of the present invention to provide an improved motor control apparatus for a reel-to-reel tape drive system which can exercise fine control over positioning and tensioning with a rapid response and without hunting.

According to the present invention, there is provided a motor control apparatus for an unbuffered reel-to-reel drive system including independently operable first and second drive motors, and first and second reels for winding or rewinding a tape and being driven by the drive motors, including: first and second sensors for detecting rotation of the reels, the first sensor providing one or more rotation signals per revolution of the first reel, and the second sensor providing a plurality of rotation signals each including a pair of signals having a predetermined phase difference defined by the rotational direction of the second reel, per revolution of the second reel; and a circuit for cooperatively controlling the drive motors to maintain tension applied to the tape on the basis of a servo-mechanism control algorithm and a stop-lock control algorithm using control signals having hysteresis curves in response to position deviation and a transport direction of the tape.

The servo-mechanism control algorithm is specifically defined by the radius of the corresponding reel, a speed difference between the transport reference speed and the actual transport speed, the transport direction, and the tension applied to the tape.

To realize the above function, preferably, the drive motor control circuit includes a circuit for calculating radii of the reels on which are wound or rewound the tape in response to the rotation signals output from the first and second sensors, a circuit for determining a transport direction of the tape in accordance with the phase relationship of the pair of signals output from the second sensor, a circuit for calculating a transport reference speed of the tape on the basis of the radii calculated at the radii calculating circuit, a circuit for detecting an actual transport speed of the tape on the basis of the rotation signal from the first and/or second sensors, first and second circuits for providing control signals to the drive motors to cooperate with both drive motors at a tension applied to the tape at a predetermined value, each control signal being defined by the radius of the corresponding reel, a speed difference between the transport reference speed and the actual transport speed, the transport direction, and the tension applied to the tape, and a circuit for applying a stop-lock control signal to the second control signal-providing circuit when an actual stop position of the tape is at a predetermined position deviation to a desired stop position, the stop-lock control signal having different values in response to a position deviation between the desired stop position and the actual stop position and a transport direction of the tape.

More preferably, the stop-lock control algorithm in the drive motor control circuit is applied only during a stop motion time. Also, the second sensor may output a pair of signals which may have a phase difference of approximately 90° as one rotation signal of the pair, one signal being in advance of another signal of the pair by that phase difference in the forward transport direction and being retarded from the other signal by that phase difference in the backward transport direction.

Preferably, the unbuffered reel-to-reel drive system further includes a member for adjusting a tension applied to the tape to maintain the tension at a predetermined value, provided between the reels and adjacent to the first reel, and providing a signal in response to the adjusted tension. At the same time, the control apparatus further includes a circuit for adjusting the first control signal in the first control signal-providing circuit in response to the signal output from the tension adjusting member.

More specifically, the motor control apparatus in accordance with the present invention can be applied to an unbuffered reel-to-reel magnetic tape transport system provided with a read/write magnetic head between the reels, the magnetic tape being a high-density magnetic tape forming a plurality of tracks each including a plurality of pairs of a data storage block and an inter-recorded gap in a longitudinal direction. A motor control circuit in a motor control apparatus exercises control to stop the magnetic tape so that the inter-recorded gap faces the center of the read/write magnetic head in response to a control request signal during a stop-mode of the reel-to-reel drive system.

BRIEF DESCRIPTION OF THE DRAWINGS

Other objectives and features of the present invention will be described below in detail with reference to the accompanying drawings, in which:

FIGS. 6a to 6c are timing charts of output signals of the pulse generator in FIG. 5;

FIG. 7 is a detailed circuit diagram of the radius computing circuit in FIG. 5;

FIGS. 9a to 9m are timing charts of signals in FIG. 8 when the rotational direction is forward;

FIGS. 10a to 10m are also timing charts of signals in FIG. 8 when the rotational direction is backward;

DESCRIPTION OF THE PREFERRED EMBODIMENTS

Figure 1:
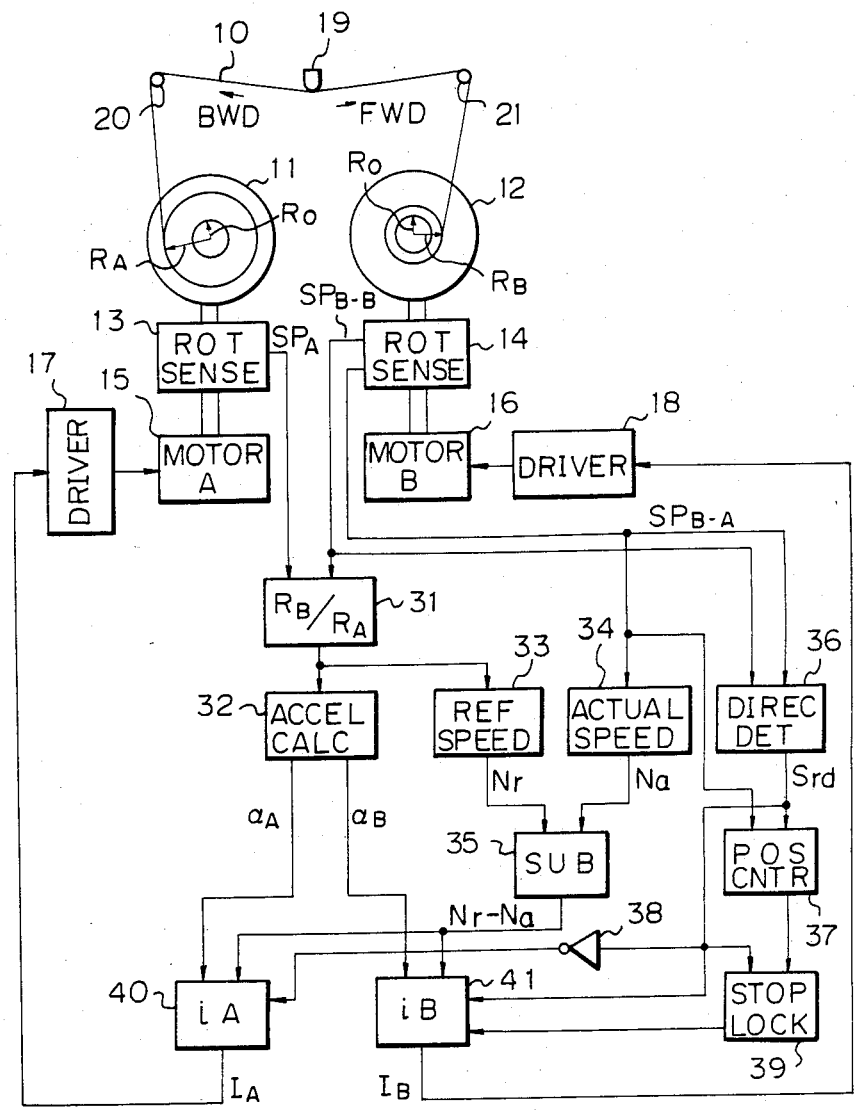
FIG. 1 is a block diagram of an embodiment of a motor control apparatus for a reel-to-reel magnetic tape drive system in accordance with the present invention.

FIG. 1 is a block diagram of an embodiment of a motor control apparatus for a reel-to-reel magnetic tape drive system in accordance with the present invention. In FIG. 1, the reel-to-reel magnetic tape drive system includes mechanical portions of independently operable drive motors 15 and 16, rotation sensors 13 and 14, reels 11 and 12 driven by the motors 15 and 16, a read/write magnetic head 19, and rollers 20 and 21 guiding a magnetic tape 10. The magnetic tape drive system further includes control drivers 17 and 18 for activating the drive motors 15 and 16. The magnetic tape drive system also includes a control circuit consisting of a circuit 31 for computing a radius $R_A$ of the reel 11 on which is wound the magnetic tape 10 and a radius $R_B$ of the reel 12 on which is wound the magnetic tape 10, a circuit for calculating drive currents of the motors 15 and 16 in response to accelerations of the reels 11 and 12, a reference speed computing circuit 33, an actual speed computing circuit 34, and a subtraction circuit 35. The control circuit further includes a rotational direction detecting circuit 36, a rotary position counter 37, an inverter 38, and a stop-lock circuit 39. The control circuit includes circuits 40 and 41 for generating control currents for the drive motors 15 and 16.

The basic operation of the reel-to-reel magnetic tape drive system in FIG. 1 will be explained.

Figure 2:
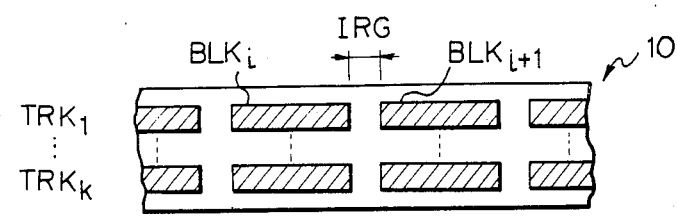
FIG. 2 is a schematic view of the magnetic tape 10 in FIG. 1.
Figure 3:
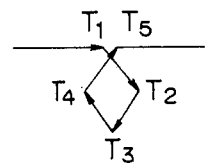
FIG. 3 is a view illustrating timing of motor control.

FIG. 2 is a schematic view of the magnetic tape 10. The magnetic tape 10 consists of a plurality of , k in the embodiment, tracks $TRK_1$ to $TRK_k$, each including a plurality of memory blocks BLK, adjoining memory blocks being separated by the IRG. The magnetic tape 10 is accessed by the read/write head 19. FIG. 3 is a view illustrating timing of the motor control. Supposing when the memory block $BLK_i$ is accessed and the magnetic tape is once stopped at the IRG, the motors 11 and 12 are driven as follows: being placed in a stop mode at a time $T_1$, reversing their rotational directions at a time $T_2$, again being placed in a stop mode at a time $T_3$, then stopping at a time $T_4$ to place the IRG facing a center of the read/write head 19. After that, when the next memory block $BLK_{i+1}$ must be accessed, the motors 11 and 12 are simultaneously driven at the time $T_5$ to reach the rated speeds to correctly access the memory block $BLK_{i+1}$ with a predetermined tension. As mentioned before, the length of the IRG of the high-density magnetic tape is shortened, so the above position control must be precisely effected.

In addition, during the stop mode at the time $T_5$ in FIG. 3, the position of the magnetic tape 10 must be kept without tape slippage, even if there is unevenness of the characteristics, such as torques of the motors 11 and 12 or disturbances is applied to the reel-to-reel magnetic tape drive system.

To effect read/write operation and wind/rewind operation of the magnetic tape 10, a suitable tension must be applied to the magnetic tape 10 irrespective of the stop and transport of the magnetic tape 10.

To maintain the magnetic tape 10 at a desired stop position with a predetermined tension, a torque $T_A$ of the first reel or the file reel 11 must be equal to a torque $T_B$ of the second reel or the machine reel 12. The torques $T_A$ and $T_B$ are respectively defined by radii of the reels 11 and 12 on which are wound the magnetic tape 10. Accordingly, first, the radii of the respective reels 11 and 12 must be obtained.

The circuit 31 computes the radii $R_A$ and $R_B$ of the reels 11 and 12 by the following equations:

$$\pi(R_A^2 - R_0^2) + \pi(R_B^2 - R_0^2) = t \cdot L \tag{1}$$

$$R_A = k_c \cdot (P_B/P_A) R_B \tag{2}$$

where,
$R_0$: a minimum radius of the reel
t: thickness of the magnetic tape
L: length of the magnetic tape
$P_A$: pulses for every revolution of the reel 11
$P_B$: pulses for every revolution of the reel 12
then $$R_B = \sqrt{\frac{C}{1 + \left(k_c \cdot \frac{P_B}{P_A}\right)^2}} \tag{3}$$

$$R_A = \sqrt{C - R_B^2} \tag{4}$$

where, $$C = (t \cdot L)/\pi + 2R_0^2 \tag{5}$$

In the equations, reference $P_A$ and $P_B$ indicate actual pulses produced by the sensor 13 and 14, and thus are not constant. In addition, a coefficient Kc defines a ratio of pulses for every revolution of the reels, which is a constant of 1:1000 in the embodiment.

As clearly understood from the aforementioned, the number of pulses $P_A$ in each revolution of the reel 11 of the first rotary sensor 13 must be different from that of pulses $P_B$ of the second rotary sensor 14.

The circuit 32 calculates electrical current $I_A$ and $I_B$ (Ampere) for driving the reels 11 and 12 by the following equations:

$$I_A = \frac{g \cdot d}{K_T \cdot R_A} \{G(R_A^4 - R_0^4) + J_0\} \tag{6}$$

$$I_B = \frac{g \cdot d}{K_T \cdot R_B} \{G(R_B^4 - R_0^4) + J_0\} \tag{7}$$

wherein,
g: a gain factor (no dimension)
d: acceleration factor in a tangential direction (cm/sec²)
$K_T$: torque constant of the motor (kg.cm/Ampere)
G: inertial factor of the magnetic tape transport (g.sec²/cm³)
$J_0$: inertial value of the reel when the magnetic tape is not wound on the reel (g.cm.sec²)

The above currents $I_A$ and $I_B$ have positive values when the magnetic tape 10 is transported in a forward direction FWD as shown in FIG. 1 and negative values when transported in a backward direction BWD.

A reference speed Nr can be obtained by the following equation at the reference speed computing circuit 32:

$$Nr = C_N(2\pi R/Sr) \tag{8}$$

where,
Nr: reference speed (count, 1 count = 1/cm/sec)
Sr: a value obtained at the circuit 31
R: rated radius of the reel
$C_N$: constant.

Generally, a current to be applied to the motor is defined as a summation of a current $I_i$ for the inertial compound of the reel, as defined by the equations (6) and (7), and a current $I_t$ for tension, as defined by the following equations:

$$I_{tA} = (F \cdot R_A/K_T) \tag{9}$$

$$I_{tB} = (F \cdot R_B)/K_T \tag{10}$$

where,
F: tension of the magnetic tape (F>0) $I_{tA}$ and $I_{tB}$ (Ampere) are electrical currents and are part of the currents $I_A$ and $I_B$ in equations (11) and (12), depending upon tension F and the radii $R_A$ and $R_B$.

Accordingly, ideal currents $I_A$ and $I_B$ supplied to the motors 15 and 16 through the drivers 17 and 18, when the magnetic tape 10 is transported at the reference speed Nr, can be expressed by the following equations and output from the current generating circuits 40 and 41.

$$I_A = \frac{g \cdot d}{K_T \cdot R_A} \{G(R_A^4 - R_0^4) + J_0\} + \frac{F}{K_T} R_A \tag{11}$$

$$I_B = \frac{g \cdot d}{K_T R_B} \{G(R_B^4 - R_0^4) + J_0\} + \frac{F}{K_T} R_B \tag{12}$$

The rotation sensor 14 outputs a pair of pulses $SP_{B-A}$ and $SP_{B-A}$ as one rotational signal which have a predetermined phase difference, for example, the pulse $SP_{B-A}$ is 90° in advance of the pulse $SP_{B-B}$ when the reel 14 rotates in the forward direction, while the pulse $SP_{B-A}$ is 90° retarded from the pulse $SP_{B-B}$ when the reel 14 rotates in the backward direction. The rotational direction detecting circuit 36 receives these pulses $SP_{B-A}$ and $SP_{B-B}$, discriminates the magnetic tape transport direction, and outputs a rotational direction signal $S_{rd}$.

Actually, the magnetic tape 10 may not be transported at the reference speed Nr. Thus, the above currents must be modified taking into account a speed difference between the reference speed Nr and an actual speed Na, and defined with the following equations instead of the above equations (11) and (12):

$$I_A = \frac{g \cdot d}{K_T \cdot R_A} \{G(R_A^4 - R_0^4) + J_0\} \frac{Na - Nr}{N_r} + \frac{F}{K_T} R_A \quad (13)$$

$$I_B = \frac{g \cdot d}{K_T R_B} \{G(R_B^4 - R_0^4) + J_0\} \frac{Na - Nr}{N_r} + \frac{F}{K_T} R_B \quad (14)$$

The first term in the right hand side in equations (13) and (14) must be zero when Na=Nr. In this case, it is sufficient to apply the current including only the tension control component to the motor.

The actual speed Na can be obtained at the actual speed computing circuit 34 in a conventional way, such as by counting the pulses $SP_{B-A}$ in a certain period.

Irrespective of the above control over the drive motors 11 and 12 through the drivers 17 and 18, transport-drift of the magnetic tape 10 may still be caused due to, for example, unbalance of the torques of the reels 11 and 12, fluctuation of the tension, and other disturbances. When a disturbance causes an increase in the current $I_B$ for the motor 16 over that defined by the aforementioned value, the torque of the reel 12 may be increased, resulting in a difference of the torques of the reels 11 and 12 and, thus, transport of the magnetic tape 10 in a forward direction. This, obviously, adversely affects the magnetic tape drive. An unbuffered reel-to-reel magnetic tape drive system suffers from the above transport-drift more often than a buffered magnetic tape drive system.

Figure 4:
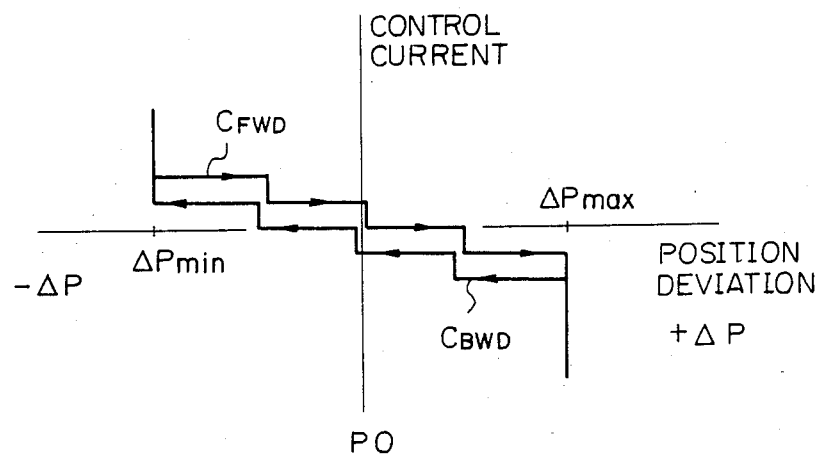
FIG. 4 is a view illustrating waveforms of the control signal $S_{SL}$ output from the stop-lock control circuit in FIG. 1.

The stop-lock circuit 39 in accordance with the present invention solves the above problems. In the stop mode of the magnetic tape transport, the stop-lock circuit 39 receives a desired stop position of the magnetic tape and outputs a stop-lock control signal $S_{SI}$ to the current generation circuit 41. Note that the stop-lock control signal $S_{SL}$ is applied to only the second current generation circuit 41 for the second drive motor 16. Also note that the stop-lock control signal $S_{SL}$ has a nonlinear discrete characteristic, as shown in FIG. 4. FIG. 4 is a view illustrating waveforms of the stop-lock control signal $S_{SL}$. In FIG. 4, the ordinate indicates position deviation with respect to the desired stop position Po of the magnetic tape 10 and the absissa indicates the stop-lock control current added to the aforementioned current $I_B$. Curve $C_{FWD}$ indicates one stop-lock control current when the position deviation of the magnetic tape $\Delta P = Po - Pa$, where Pa is an actual position, changes from negative to positive, that is, the motor should be rotated in a forward direction. The stop-lock control current can be changed in value in response to the position deviation and the transport direction. Curve $C_{BWD}$ indicates another stop-lock control current when the position deviation $\Delta P$ changes from positive to negative. The stop-lock control current can be defined by the hysteresis of curves $C_{FWD}$ and $C_{BWD}$ in a range of position deviations $\Delta P_{min}$ and $\Delta P_{max}$. As will be clearly understood from curves $C_{FWD}$ and $C_{BWD}$, the stop-lock control current in the forward direction differs from that in the backward direction. These stop-lock control currents are defined on the basis of actual operational characteristics of the motors 15 and 16, which may be slightly different from each other.

Figure 5:
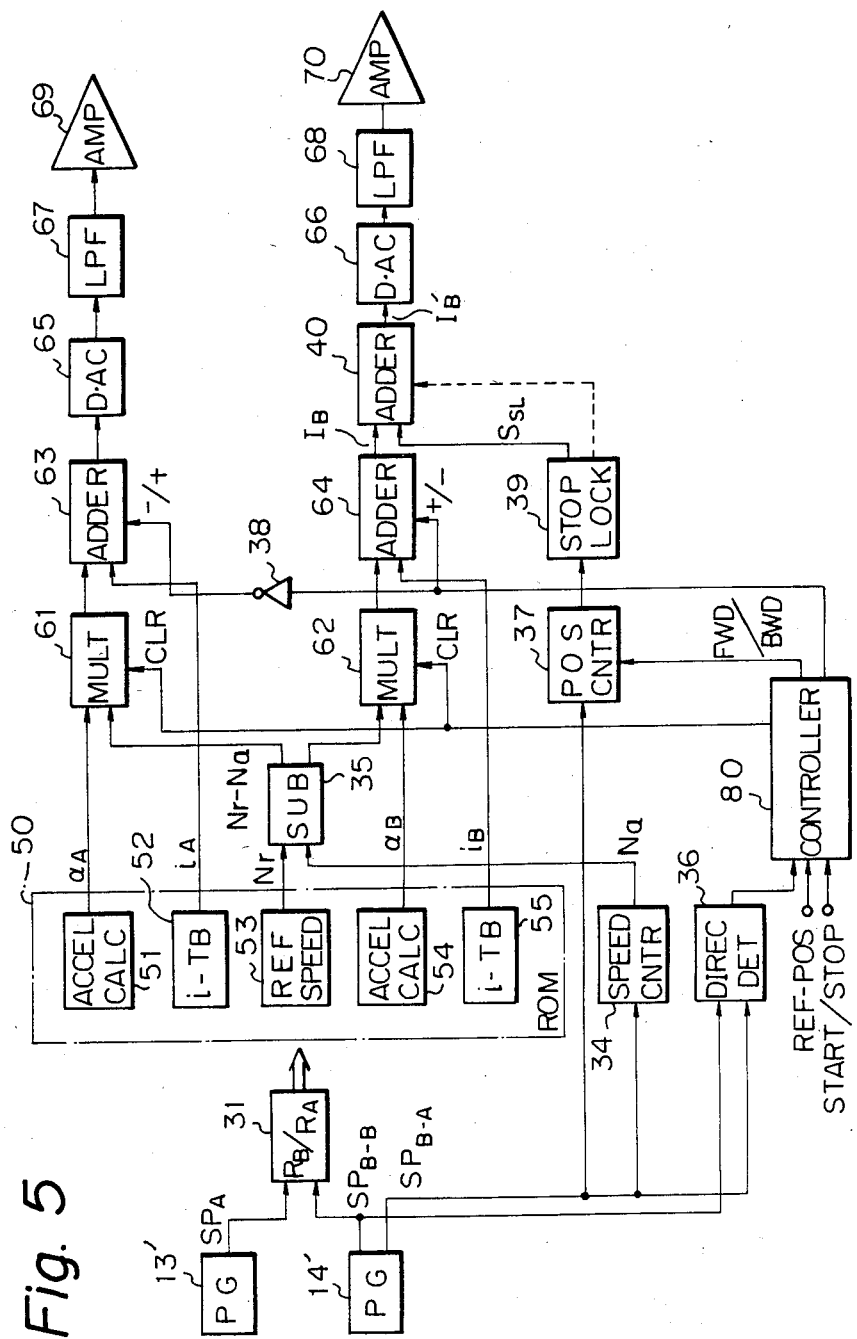
FIG. 5 is a specific circuit diagram of the reel-to-reel magnetic tape drive system shown in FIG. 1, except that the mechanical portions are omitted.

FIG. 5 is a specific circuit diagram of the reel-to-reel magnetic tape drive system shown in FIG. 1, except that the mechanical portions are omitted. In FIG. 5, the control circuit consists of the circuit 31 for computing the radii $R_A$ and $R_B$ and their ratio $R_A/R_B$, a read-only-memory (ROM) 50, the actual speed computing circuit 34, the rotational direction detecting circuit 36, the subtraction circuit 35, a controller 80, the rotary position counter 37, the inverter 38, the stop-lock circuit 39, and an adder 40. The control circuit also includes a series-connected multiplier 61, an adder 63, a digital-to-analog converter (DAC) 65, and a low bandpass filter (LPF) 67 for the first drive motor 15 and another series-connected multiplier 62, an adder 64, a digital-to-analog converter 66 and a low bandpass filter 68 for the second drive motor 16. Amplifiers 69 and 70 are power amplifiers for applying drive currents to the drive motors 15 and 16 in accordance with the control currents and are located in the drivers 17 and 18.

The rotation sensors 13 and 14 in FIG. 1 are pulse generators 13' and 14' in the embodiment of FIG. 5. The pulse generator 13' outputs pulses $SP_A$ proportional to the rotation of the reel 11. The pulse generator 14' also outputs pulses $SP_B$ each consisting of a pair of pulses $SP_{B-A}$ and $SP_{B-A}$, which are different in phase by 90°, for finding the rotational direction of the reels 11 and 12, i.e., the transport direction of the magnetic tape 10. The pulse generator 13' outputs one pulse in each revolution, as shown in FIG. 6a. The pulse generator 14' outputs one thousand rotational signals, each consisting of a pair of pulses $SP_{B-A}$ and $SP_{B-B}$ having a phase difference of approximately 90°, in each revolution of the reel 12, as shown in FIG. 6b.

Figure 6C:
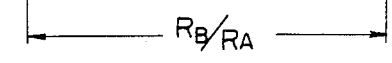

FIG. 7 is a detailed circuit diagram of the radius computing circuit 31. In FIG. 7, the circuit 31 includes up/down (U/D) counters 311 to 313, an AND gate 321, NAND gates 322 and 323, AND gates 331 to 334, a J-K flip-flop 315, a register 314, an OR gate 341, and an inverter 342. In FIG. 7, CLK designates a clock pulse having a 1 MHz oscillation rate, FWD a forward transport direction signal output from the direction detection circuit 36, $SP_A$ a pulse signal output from the pulse generator 13', and $SP_{B-B}$ a pulse signal output from the pulse generator 14'. The FWD signal applied directly to the U/D counter 311 and to the U/D counters 312 and 313 through the respective gates 321 and 322 directs the counting direction of the input signal in the U/D counters, which is either count up when the FWD signal is high level or down when the FWD signal is low level. The U/D counters count the number of pulses $SP_{B-B}$ with respect to the pulse $SP_A$, as shown in FIGS. 6a to 6c. The circuit consisting of the AND gates 331 to 334, the J-K flip-flop 315, the inverter 342, and the OR gate 341 finds the direction of the counting in response to the pulse $SP_A$ and the FWD signal. The direction signal found at the above circuit is applied to the register 314 through the NAND gate 323. The register 314 receives the counted values from the U/D counters 312 and 313 and processes the counted values in response to the signal from the NAND gate 323 to output radii $R_A$ and $R_B$ of the reels 11 and 12 on which are wound the magnetic tape 10. In a forward transport direction, the radius $R_B$ will increase in response to the increment of the pulses $SP_{B-B}$, while the radius $R_A$ will naturally decrease simultaneously.

Figure 8:
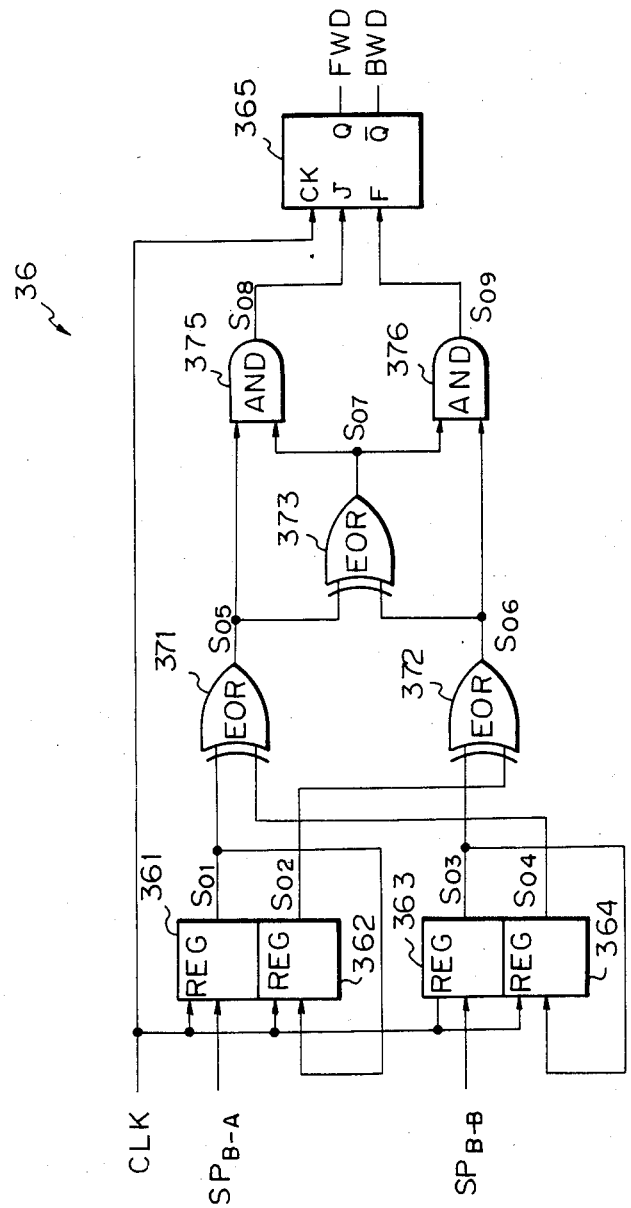
FIG. 8 is a detailed circuit diagram of the rotational direction detection circuit in FIG. 5.

FIG. 8 is a detailed circuit diagram of the rotational direction detection circuit 36. In FIG. 8, the circuit 36 consists of registers 361 to 364, exclusive OR (EOR) gates 371 to 373, AND gates 375 and 376, and a J-K flip-flop 365.

FIGS. 9a to 9n are timing charts of signals in FIG. 8 when the rotational direction is forward, i.e., the pulse signal $SP_{B-A}$ in FIG. 9a leads the pulse signal $SP_{B-B}$ in FIG. 9b by a phase 90°. In this case, the forward direction signal FWD having a high logic level as shown in FIG. 9e is output at a Q-output terminal of the J-K flip-flop 365. On the other hand, the backward direction signal BWD having a low logic level as shown in FIG. 9m is output at a $\overline{Q}$-output terminal of the J-K flip-flop 365.

FIGS. 10a to 10m are timing charts of signals in FIG. 8 when the rotational direction is backward, i.e., the pulse signal $SP_{B-A}$ in FIG. 10a is retarded from the pulse signal $SP_{B-B}$ in FIG. 10B by a phase 90°. Accordingly, in this case, the forward direction signal FWD is a low logic level, however, the backward direction signal BWD is a high logic level.

In FIGS. 9a to 9m and 10a to 10m, "L" indicates a low logic level, i.e., 0 volt, and "H" a high logic level, i.e., 5 volt.

Figure 11:
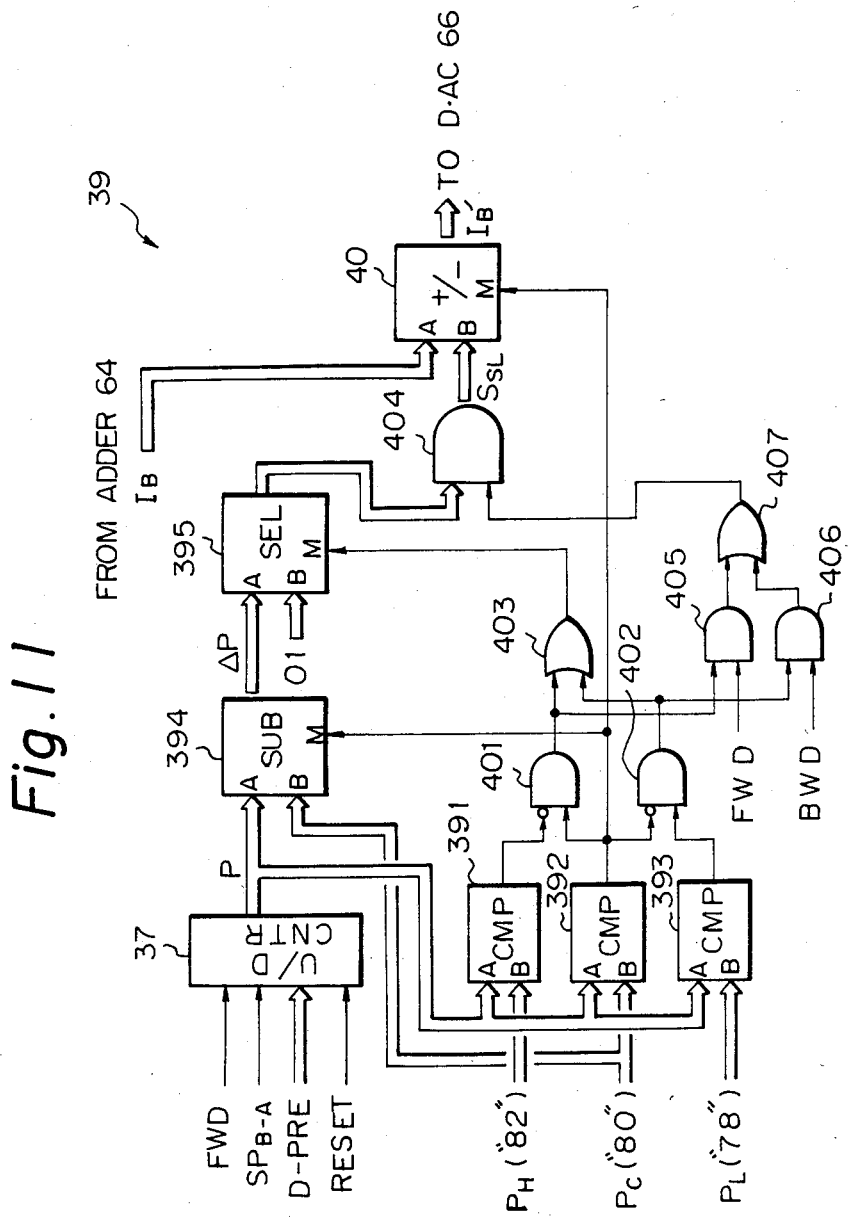
FIG. 11 is a circuit diagram of a position counter, stop-lock circuit, and adder in FIG. 5.

FIG. 11 is a circuit diagram of the position counter 37, the stop-lock circuit 39, and the adder 40.

The position counter 37 is a U/D counter receiving the forward direction signal FWD, the rotational position pulse $SP_{B-A}$ of the reel 12, data preset signal D-PRE, and a counter reset signal RESET. The U/D counter 37 consist of eight bits countable up to 255, in other words, countable up to +127 in a forward direction and up to −127 in a backward direction with respect to a center position of the counter, which is 128, i.e., the hexadecimal "80". The data preset signal D-PRE designating the position of the magnetic tape 10 to be stopped without slippage and being the hexadecimal "80" is applied to the U/D counter 37. The U/D counter 37 counts up or down the pulses $SP_{B-A}$ with respect to the hexadecimal "80" in response to the forward direction signal FWD. When the magnetic tape 10 is stopped at a desired position without slippage, the position count P of the U/D counter 37 is "80". On the other hand, when the magnetic tape 10 drifts in position in a forward direction, the position count P may be advanced more than "80".

In FIG. 11, the stop-lock circuit 39 includes comparators 391 to 393, AND gates 401 and 402, each having an inverted input terminal, OR gates 403, 407, AND gates 404, 405, 406, a subtraction circuit 394, a selector 395, and an adding and subtracting circuit 396.

Figure 12:
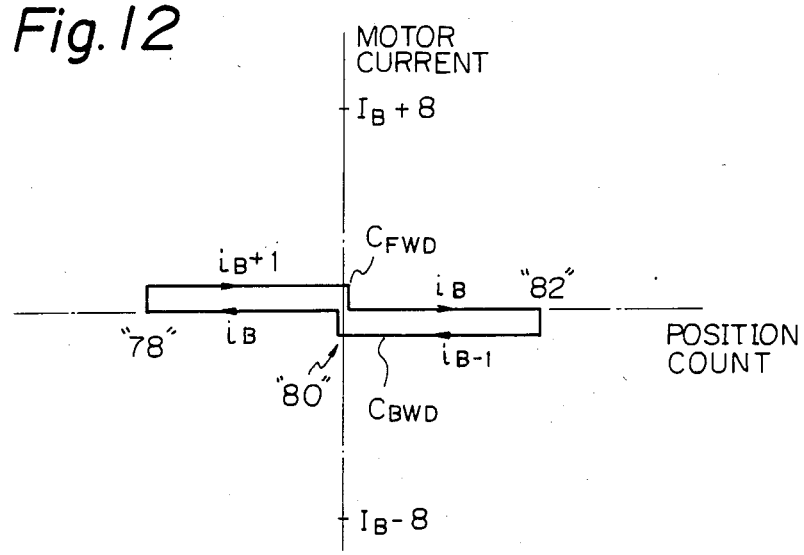
FIG. 12 shows stop-lock control signal curves.

FIG. 12 shows stop-lock control signal curves $C_{FWD}$ and $C_{BWD}$. The curves $C_{FWD}$ and $C_{BWD}$ shown in FIG. 12 are examples of those shown in FIG. 4.

The operation of the stop-lock circuit 39 will be explained below with reference to FIG. 12.

The comparators 391 to 393 commonly receive, on one hand, the position count P output from the U/D counter 37 and, on other hand, predetermined reference numbers $P_H$, $P_C$, and $P_L$ which define the stop-lock operation range, in the embodiment, the hexadecimal "82", "80", and "78", respectively. The comparator 391 compares the position count P with the reference number "82" and outputs a high level signal when the position count P is equal to or greater than the reference value of hexadecimal "82". The comparator 392 outputs a high level signal when the position count P is equal to or greater than the reference value of hexadecimal "80". Also, the comparator 393 outputs a high level signal when the position count P is equal to or greater than the reference value of hexadecimal "78". Consequently, when an output signal at the OR gate 403 is high, the position of the magnetic tape 10 is in a range of two counts advanced with respect to the desired stop position or two counts retarded. In this range, the stop-lock circuit 39 outputs the stop-lock control signal, having a hysteresis curve, illustrated in FIG. 12. The gates 405 to 407 find that either the magnetic tape position is two counts advanced with respect to the desired position and the direction is forward or the magnetic tape position is two counts retarded and the direction is backward. The subtraction circuit 394 computes a position difference ΔP in accordance with the following formula: ΔP = (the position count P) − (the reference number $P_C$) when a subtraction indicating signal applied to a terminal M is high level, i.e., the position count P is equal to or greater than the reference number $P_C$, or ΔP = (the reference number $P_C$) − (the position count P) when the subtraction indicating signal is low level. The selector 395 receives the position difference ΔP and a reference number 1 which is an incremental number in curve $C_{FWD}$ or a decremental number in curve $C_{BWD}$. The selector 395 outputs the reference number of 1 when a selection indicating signal applied to a terminal M is high level, i.e., the magnetic tap 10 is in the aforementioned range, and the position difference ΔP when the selection indicating signal M is low level. The selected signal is applied to an input terminal B of the adder 40 when either the magnetic tape 10 is in the position of hexadecimal "70" to "80" and the transport direction is forward as shown in FIG. 12 or the magnetic tape 10 is in the position of hexadecimal "80" to "82" and the transport direction is backward.

The adder 40 receives a basic control current $I_B$ for driving the second drive motor 16 output from the adder 64, which will be explained again in detail, and the stop-lock control signal $S_{SL}$ output from the stop-lock circuit 39 mentioned above. The adder 40 outputs a compensate control current $I_B'$ for driving the second drive motor 16, which is computed by the following formula:

$$I_B' = I_B - S_{SL}, \text{ when } M = \text{high-level} \quad (15)$$

$$I_B' = I_B + S_{SL}, \text{ when } M = \text{low-level} \quad (16)$$

where, M = computation indicating signal applied to the adder 40.

Referring now back to FIG. 5, the operation of the magnetic tape motion control apparatus and the unbuffered reel-to-reel magnetic tape drive system will be explained below in detail.

In an initial condition, an origin of the magnetic tape 10 must be positioned at a predetermined place, for example, a center of the read/write head 19, in a conventional manner. At the same time, a predetermined tension F, for example, 100 grams, must be applied to the magnetic tape 10 to maintain the magnetic tape 10 at the origin. At this stage, the multipliers 61 and 62 are cleared by the controller 80, thus, the control currents $I_A$ and $I_B$ applied to the drive motors 15 and 16 through the drivers 17 and 18 are defined by the following equations:

$$I_{AO}=(F/K_T)R_A \quad (17)$$

$$I_{BO}=(F/K_T)R_B \quad (18)$$

The above currents $I_{AO}$ and $I_{BO}$ are generated at the current generating portions 52 and 55 in the ROM 50. The initial current $I_{AO}$ is shown in FIG. 13b.

During the stop-mode, the stop-lock control circuit 39 is operable when an actual stop position may shift from the origin within ±2 position counts to output the stop-lock control signal $S_{SL}$ as shown in FIG. 12, which is determined by the position deviation $\Delta P$ and the transport direction. As a result, the magnetic tape 10 is maintained at the origin.

Figure 13A:
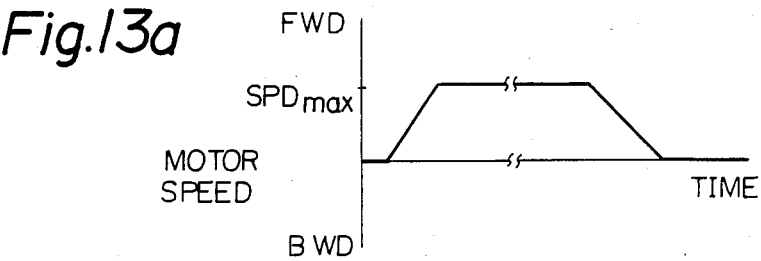
FIGS. 13a and 13b show a motor speed control characteristic curve and a control signal curve in connection with the motor speed control characteristic curve.
Figure 13B:
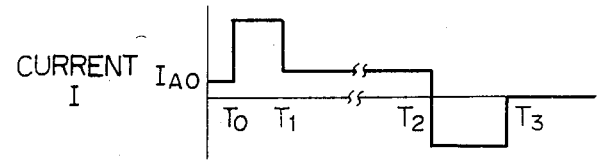

When the controller 80 receives a control command from a host computer (not shown), including a start-up signal START, and a reference position REF-POS to be a certain IRG in the magnetic tape 10 stopped at the center of the read/write magnetic head 19, for accessing on a desired data storage block BLK, at a time $T_0$ shown in FIG. 13b, the circuits 51, 52, 61, 63, and 65 and the circuits 54, 53, 62, 64, 40, and 65 output control currents $I_A$ and $I_B$, which may have maximum current values, as shown in FIG. 13b for the control current $I_A$, to the amplifiers 69 and 70 in the drivers 17 and 18 through the low bandpass filters 67 and 68 at a time $T_D$. As a result, the drive motors 15 and 16 are operated and reach a maximum speed SPD max at a time $T_1$ as shown in FIG. 13a. After that, the control currents $I_A$ and $I_B$ are reduced in a uniform motion with a maxium speed. The currents are defined by the equations (13) and (14). As will be clearly understood, the circuits 51 and 54 for generating acceleration components when the transport direction is forward or deceleration components when the transport direction is backward in response to the radii output from the radii calculation circuit 31, the reference speed generating circuit 53, and the circuits 52 and 55 for generating the tension components in the ROM 50 are operated in a table look-up manner to facilitate prompt signal generation. In addition, in order to rapidly obtain the first terms in equations (13) and (14), the acceleration calculation circuits 51 and 54 generate the following components and output them to the multipliers 61 and 62, respectively.

$$\frac{g \cdot d}{K_T \cdot R_A} \{G(R_A^4 - R_0^4) + J_0\} \frac{1}{N_r}$$

$$\frac{g \cdot d}{K_T R_B} \{G(R_B^4 - R_0^4) + J_0\} \frac{1}{N_r}$$

The speed difference: $N_a - N_r$ obtained at the subtraction circuit 35 is applied to the multipliers 61 and 62. By this, the computation of division $N_a - N_r/N_4$ is omitted.

Along with the approach of the magnetic tape 10 to the reference position at a time $T_2$, The above control currents $I_A$ and $I_B$ are inverted to predetermined values to decelerate the drive motors 15 and 16 until the position deviation between the reference position and the actual position is in a predetermined range.

The above control operation is similar to that of the conventional control system. During the above operation, the tension of the magnetic tape 10 can be maintained at a predetermined value F, for example, 100 grams.

When the desired reference position of the magnetic tape reaches the center of the read/write magnetic head 19 or a predetermined marginal position, i.e., ±2 position counts in the embodiment, at a time $T_3$, a stop signal STOP is applied to the controller 80 to clear the multipliers 61 and 62. As a result, the control apparatus shown in FIG. 5 operates in a stop-mode as mentioned before as the initial condition. The stop-lock control circuit 39 can actually be operable to maintain the desired stop position of the magnetic tape 10 facing the center of the read/write magnetic head 19. Accordingly, in the stop-mode, even if a disturbance causing an unbalance of the torques applied by the drive motors 15 and 16 for maintaining the tension of the magnetic tape 10 is applied to the reel-to-reel magnetic tape drive system, the desired stop position is maintaining within a marginal position range due to the stop-lock control circuit operation.

As mentioned above, the stop-lock control curves are defined to meet actual operations of the drive motors and may be formed as a hysteresis curve.

When the controller 80 receives a forward travelling signal for accessing the read/write magnetic head 19 on the desired data storage block, the control circuit shown in FIG. 5 outputs the control currents $I_A$ and $I_B$ in a similar way to the conventional method.

After accessing, the control circuit is again rendered in a stop-mode.

In the above embodiment, the tension components calculated at the current calculation circuits 52 and 55 in the ROM 50 are changed in their signals in response to the transport direction. When the transport direction is forward, the tension component applied to the addeer 63 is subtracted from the output of the multiplier 61 in response to an indication signal through the inverter 38 and the tension component applied to the adder 64 is added to the output of the multiplier 62.

As mentioned above, if any disturbances, such as an unbalance of the drive motors' operational characteristics, drift of the amplifiers, or external noise, arise in the unbuffered reel-to-reel magnetic tape drive system as well as in the magnetic tape motion control apparatus itself, the stop-lock control function will eliminate adverse effects due to the above disturbances, thus maintaining the tension applied to the magnetic tape and keeping the magnetic tape at the desired stop position.

In the above description, the operation in forward transport of the magnetic tape 10 was discussed. The backward operation is similar.

The pulse generation rates of the pulse generators 13' and 14' can be changed to, for example, two or more per rotation for the pulse generator 13' and two thousand or more per rotation for the pulse generator 14' to improve accuracy of position control of the magnetic tape 10.

The phase difference of the pair of signals output from the pulse generator 14 may be approximately from 15° to 165° which can discriminate the transport direction, however, is preferably approximately 90°.

The rotation sensors 13 and 14 can be replaced with numerous sensing devices, such as tachometers and proximate-sensors of magnetic type or optical type.

In the above embodiment, the main parts of the control circuit shown in FIG. 5 are formed by discrete type circuits, thus the digital-to-analog converters 67 and 68 are provided to apply the control currents to the amplifiers 69 and 70. However, the control circuit can be formed by analog type circuits or by using a microcomputer.

Figure 14:
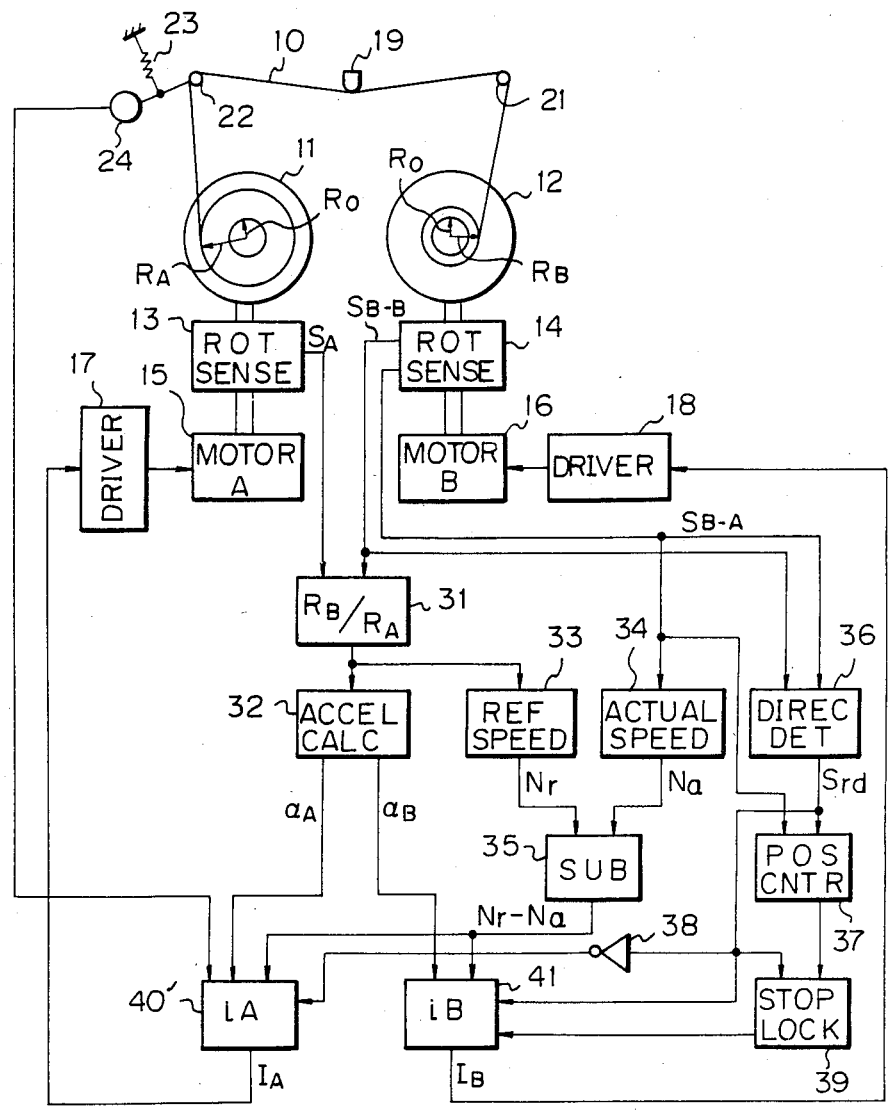
FIG. 14 is a block diagram of another embodiment of a motor control apparatus for a reel-to-reel magnetic tape drive system in accordance with the present invention.

FIG. 14 is a block diagram of another embodiment of a motor control apparatus for a reel-to-reel magnetic tape drive system in accordance with the present invention.

The motor control apparatus in FIG. 14 is similar to that shown in FIG. 1, except: a movable direction roller 22 supported on a pivot arm, a spring 23, and a tension sensor 24 at the arm pivot are provided in the drive system and a modification 40' of the control current generation circuit 40 is provided. Elements bearing the same references as those in FIG. 1 are identical to those in FIG. 1.

Irrespective of the fine tension and position control of the magnetic tape in accordance with the embodiment, a drive system which includes only the fixed direction rollers 20 and 21, in other words, which does not include any minor tension buffering means, cannot absorb the tension fluctuation which may arise instantaneously by disturbance or at the start-up of the drive motors 15 and 16. In this embodiment, tension adjustment means consisting of the spring 23 and the movable roller 22 are provided.

The tension adjustment means functions to mechanically maintain the tension F applied to the magnetic tape 10 at a predetermined value, for example, 100 grams. The spring 23 has a spring force $F_S$ of 100 grams to meet the tension F. If the tension F is 100 grams, the spring force $F_S$ and the tension F are balanced, thus the pivot arm supporting the movable direction roller 22 is placed at a balanced position and the tension sensor 24 outputs a zero signal. If the tension F exceeds 100 grams, the pivot of the movable direction roller 22 is shifted down to a position where the tension F is equal to the spring force $F_S$, thus the tension sensor 24 outputs a signal proportional to deviation of the tension F and the spring force $F_S$ and vice versa. The control current $I_4$ for the drive motor 15 is compensated in response to the tension deviation output from the tension sensor 24 at the control current generation circuit 40'.

Figure 15:
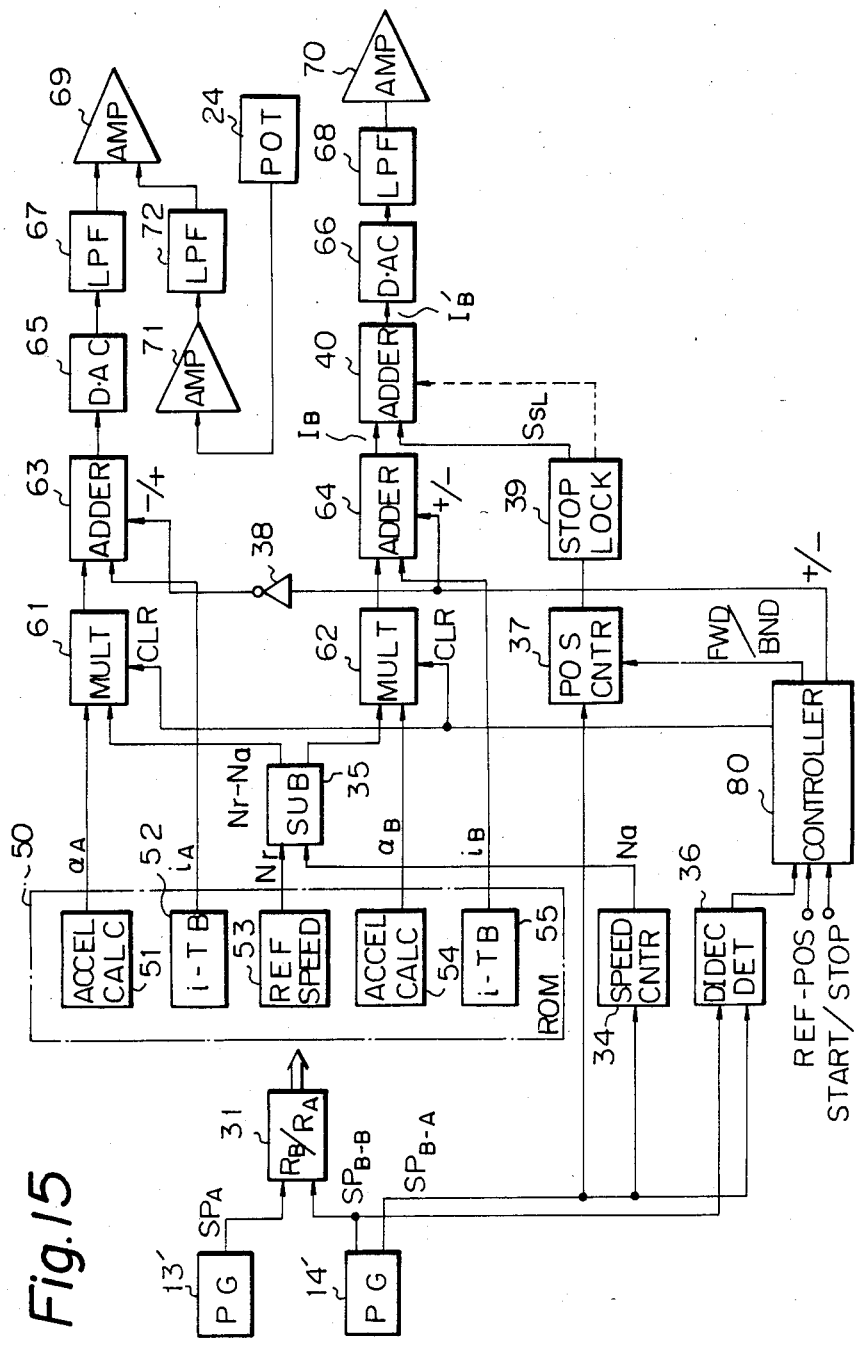
FIG. 15 is a specific circuit diagram of the reel-to-reel magnetic tape drive system shown in FIG. 14.

FIG. 15 is a detailed circuit diagram of the system of FIG. 14. The circuit of FIG. 15 is similar to that of FIG. 5 except for the addition of a potentiometer as a tension sensor 24, an amplifier 71, and a low bandpass filter 72. The potentiometer 24 outputs a voltage signal proportional to a change of the pivot of the movable roller 22. The voltage output from the potentiometer 24 is amplified with a gain factor which is adjusted to the main current generation line of circuits 61, 63, and 65 and applied to the amplifier 69 in the driver 17 through the low bandpass filter 72. In FIG. 14, the minor feedback of the tension deviation is effected at the circuit 40', however, in FIG. 15, it is effected at the driver 17.

By applying compensation control responsive to the tension deviation, the tension applied to the magnetic tape 10 is maintained at a predetermined value throughout the entire duration of the operation.

Many widely different embodiments of the present invention may be constructed without departing from the spirit and scope of the present invention. It should be understood that the present invention is not limited to the specific embodiments described in this specification, except as defined in the appended claims.

In particular, in the above embodiments, magnetic tape motion control apparatuses for the unbuffered reel-to-reel magnetic tape drive system are discussed as preferred embodiments, however the present invention is not restricted to magnetic tape drive systems.

I claim:

1. A motor control apparatus for an unbuffered reel-to-reel drive system including independently operable first and second drive motors and first and second reels for winding or rewinding a tape and being driven by said drive motors, comprising:
   first and second means for detecting rotation of said reels, said first sensor means providing one or more rotation signals per revolution of said first reel, and said second sensor means providing a plurality of rotation signals each including a pair of signals having a predetermined phase difference defined by rotational direction of said second reel, per revolution of said second reel; and
   circuit means for controlling said drive motors cooperatively to maintain tension applied to said tape on the basis of a servo-mechanism control algorithm and a stop-lock control algorithm using a control signal having a hysteresis curve defined in terms of the tape transport direction and the deviation of the tape position from a reference position when said deviation is less than a predetermined value.

2. A motor control apparatus according to claim 1, wherein said servo-mechanism control algorithm is defined by a radius of the corresponding reel, a speed difference between a transport reference speed and an actual transport speed, said transport direction, and said tension applied to said tape.

3. A motor control apparatus according to claim 2, wherein said drive motor control circuit means includes means for calculating radii of said reels on which are wound or rewound said tape in response to said rotation signals output from said first and second sensor means,
   means for determining a transport direction of said tape in accordance with the phase relationship of said pair of signals output from said second sensor means,
   means for calculating a transport reference speed of said tape on the basis of said radii calculated at said radii calculating means,
   means for detecting an actual transport speed of said tape on the basis of said rotation signal from said first and/or second sensor means,
   first and second control means for providing respective first and second control signals to said drive motors to jointly operate both drive motors to transport said tape between said reels with a tension applied to said tape at a predetermined value, each respective control signal being defined by the radius of the corresponding reel, a speed difference between said transport reference speed and said actual transport speed, said transport direction, and said tension applied to said tape, and
   means for applying a stop-lock control signal to said second control signal-providing means when an actual stop position of said tape is at a predetermined position deviation from a desired stop position, said stop-lock control signal having different values in response to a position deviation between said desired stop position and said actual stop position and a transport direction of said tape.

4. A motor control apparatus according to claim 1, wherein said stop-lock control algorithm in said drive motor control circuit means is applied only during a stop motion time.

5. A motor control apparatus according to claim 1, wherein said second sensor means outputs a pair of signals having a phase difference of from approximately 15° to approximately 165° as one rotation signal, one signal of the pair being in advance of another signal of the pair of by said phase difference in the forward transport direction and being retarded from another signal of the pair by said phase difference in the backward transport direction.

6. A motor control apparatus according to claim 1, wherein said second sensor means outputs a pair of signals having a phase difference of approximately 90° as one rotation signal, one signal of the pair being in advance of the other signal of the pair by said phase difference in the forward transport direction and being retarded from the other signal of the pair by said phase difference in the backward transport direction.

7. A motor control apparatus according to claim 1, wherein said first and second means are pulse generators.

8. A motor control apparatus according to claim 1, wherein said first and second sensor means are tachometers.

9. A motor control apparatus according to claim 1, wherein said first and second sensor means are proximate-sensing circuits.

10. A motor control apparatus according to claim 1, wherein said unbuffered reel-to-reel drive system further includes means for adjusting a tension applied to said tape to maintain said tension at a reference value, said means being provided between said reels and adjacent to said first reel, and sensor means providing a signal in response to said adjusted tension, and wherein said control apparatus further comprises means for adjusting said first control signal in said first control signal-providing means in response to said signal output from said tension adjusting means.

11. A motor control apparatus according to claim 10, wherein said tension adjusting means includes a spring having a spring force equal to said tension to be maintained at the reference value and a movable roller supported on a pivot arm, said movable roller pivoting in response to a tension difference between said spring force and said reference tension.

12. A motor control apparatus according to claim 10, wherein said sensor means is a potentiometer outputting a tension deviation signal in response to a change of position of a movable roller.

13. A motor control apparatus according to claim 1, wherein said unbuffered reel-to-reel system is a magnetic tape transport system provided with a read/write magnetic head between said reels, wherein said tape is a high-density magnetic tape forming a plurality of tracks each including a plurality of data pairs of storage block and inter-recorded gap in a longitudinal direction, and wherein said control means exercise control to stop said magnetic tape so that said inter-recorded gap faces to the center of said read/write magnetic head, in response to a control request signal during a stop-mode of said reel-to-reel drive system.

14. A motor control apparatus for an unbuffered reel-to-reel drive system including independently operable first and second drive motors and first and second reels for winding or rewinding a tape and being driven by said drive motors, comprising:

first and second means for detecting rotation of said reels, said first sensor means providing one or more rotation signals per revolution of said first reel, and said second sensor means providing a plurality of rotation signals each including a pair of signals having a predetermined phase difference defined by rotational direction of said second reel, per revolution of said second reel;

circuit means for controlling said drive motors cooperatively to maintain tension applied to said tape on the basis of a servo-mechanism control algorithm and a stop-lock control algorithm using a control signal having a hysteresis curve in response to the position deviation and a transport direction of said tape;

wherein said servo-mechanism control algorithm is defined by a radius of the corresponding reel, a speed difference between a transport reference speed and an actual transport speed, said transport direction and said tension applied to said tape; and wherein said drive motor control circuit means includes means for calculating radii of said reels on which are wound or rewound said tape in response to said rotation signals output from said first and second sensor means, means for determining a transport direction of said tape in accordance with the phase relationship of said pair of signals output from said second sensor means, means for calculating a transport reference speed of said tape on the basis of said radii calculated at said radii calculating means;

means for detecting an actual transport speed of said tape on the basis of said rotation signal from said first and/or second sensor means;

first and second control means for providing respective first and second control signals to said drive motors to jointly operate both drive motors to transport said tape between said reels with a tension applied to said tape at a predetermined value, each respective control signal being defined by the radius of the corresponding reel, a speed difference between said transport reference speed and said actual transport speed, said transport direction, and said tension applied to said tape, and means for applying a stop-lock control signal to said second control signal-providing means when an actual stop position of said tape is at a predetermined position deviation from a desired stop position, said stop-lock control signal having different values in response to a position deviation between said desired stop position and said actual stop position and a transport direction of said tape.

15. A motor control apparatus for an unbuffered reel-to-reel drive system including independently operable first and second drive motors and first and second reels for winding or rewinding a tape and being driven by said drive motors, comprising:

first and second sensor means for detecting rotation of said reels, said first sensor means providing one or more rotation signals per revolution of said firt reel, and said second sensor means providing a plurality of rotation signals each including a pair of signals having a predetermined phase difference defined by rotational direction of said second reel, per revolution of said second reel; and circuit means for controlling said drive motors cooperatively to maintain tension applied to said tape on the basis of a servo-mechanism control algorithm and a stop-lock control algorithm using a control signal having a hysteresis curve in response to position deviation and a transport direction of said tape;

wherein said second sensor means outputs a pair of signals having a phase difference of from approximately 15°0 to approximately 165° as one rotation signal, one signal of the pair being in advance of another signal of the pair by said phase difference in the forward transport direction and being retarded from another signal of the pair by said phase difference in the backward transport direction.

16. A motor control apparatus for an unbuffered reel-to-reel drive system including independently operable first and second drive motors and first and second reels for winding or rewinding a tape and being driven by said drive motors, comprising:

first and second sensor means for detecting rotation of said reels, said first sensor means providing one or more rotation signals per revolution of said first reel, and said second sensor means providing a plurality of rotation signals each including a pair of signals having a predetermined phase difference defined by rotational direction of said second reel, per revolution of said second reel; and circuit means for controlling said drive motors cooperatively to maintain tension applied to said tape on the basis of a servo-mechanism control algorithm and a stop-lock control algorithm using a control signal having a hysteresis curve in response to position deviation and a transport direction of said tape;

wherein said second sensor means outputs a pair of signals having a phase difference of approximately 90° as one rotation signal, one signal of the pair being in advance of the other signal of the pair by said phase difference in the forward transport direction and being retarded from the other signal of the pair by said phase difference in the backward transport direction.

* * * * *